UNITED STATES PATENT OFFICE.

HENRY STALAY ARTHUR HOLT, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

PRODUCING RUBBER-LIKE COMPOUNDS.

1,062,973. Specification of Letters Patent. Patented May 27, 1913.

No Drawing. Application filed December 9, 1911. Serial No. 664,874.

*To all whom it may concern:*

Be it known that I, HENRY STALAY ARTHUR HOLT, a subject of the King of England, residing at Ludwigshafen-on-the-Rhine, Germany, have invented new and useful Improvements in Producing Rubber-Like Compounds, of which the following is a specification.

The specification of British Patent No. 15,254/10 states that erythrene (divinyl) can be converted into a substance resembling natural rubber by the application of heat, either in the absence or in the presence of an agent which assists in the polymerization, but there is no special definition or description of any substance which may be employed as such agent. Further, the specification of British Patent No. 17,734/10 describes the production of such rubber-like products by heating isoprene, and it is stated that the addition of indifferent substances, or of catalytic agents, of either neutral, acid or alkaline reaction, does not interfere with the polymerization, but this specification does not contain any specific definition, or description, of a catalytic agent. It is also known generally that isoprene and its homologues, such for instance as dimethyl-buthadiene, can be polymerized yielding substances resembling rubber, and it has been suggested to employ certain compounds, such for instance as alcoholic potash, or soda, concentrated aqueous hydrochloric acid, and calcium chlorid solution, in the belief that such compounds would assist in the polymerization, but no proof has been forthcoming that such compounds favor the polymerization, or in other words, induce the formation of a larger quantity of the substances resembling rubber than would be formed if such compounds were not present. I have found that alcohols, aldehydes, alkalies, and oxids and hydroxids which act as alkalies, when added, even though only slightly soluble in isoprene, and whether employed as such or in the presence of water, actually decrease the yield, and further that the use of large quantities of strong acids does not accelerate the polymerization, but deteriorate the quality of the product obtained.

I have found that sulfur, when employed in minute quantities, brings about a considerable acceleration of the polymerization to form the desired substance resembling rubber, whereas if large quantities be employed such an improvement in the reaction is not brought about. Thus, for instance, an addition of one-fifth of one per cent. of sulfur about doubles the yield of raw rubber-like substance obtainable from isoprene, whereas if two per cent. be employed a much smaller yield of the product is obtained and this produce is very impure and, even after repeated solution and precipitation from benzene, cannot be obtained in the desired state of purity.

The following is an example of how my invention can be carried into practical effect, but the invention is not confined to this example. The parts are by weight. Heat together, in a suitable autoclave, for 5 days, at about 100° C, 500 parts of isoprene and 1 part of flowers of sulfur. The pressure then rises to about 6.5 atmospheres. Then distil off any unaltered isoprene by means of steam. The rubber-like substance remains in the form of a white elastic product. In a similar manner, homologues of isoprene can be used.

Now what I claim is:—

1. The process of producing compounds resembling rubber by heating a hydrocarbon of the homologous series of which erythrene is the lowest member, in the presence of a very small quantity of sulfur.

2. The process of producing compounds resembling rubber by heating isoprene in the presence of about one-fifth of one per cent. of sulfur.

In testimony whereof I have hereunto set my hand in the presence of two subscribing witnesses.

ARTHUR HOLT.

Witnesses:
J. ALEC. LLOYD,
A. O. TITTMANN.